(12) United States Patent
Fazekas (10) Patent No.: US 7,174,915 B2
(45) Date of Patent: Feb. 13, 2007

(54) WATER RE-CIRCULATION VALVE

(76) Inventor: Dale Fazekas, 9212 Kinlock Dr., Indianapolis, IN (US) 46256

( * ) Notice: Subject to any disclaimer, the term of this patent is extended or adjusted under 35 U.S.C. 154(b) by 54 days.

(21) Appl. No.: 10/994,996

(22) Filed: Nov. 22, 2004

(65) Prior Publication Data
US 2005/0109404 A1    May 26, 2005

Related U.S. Application Data

(60) Provisional application No. 60/523,954, filed on Nov. 24, 2003.

(51) Int. Cl.
*F16K 17/30* (2006.01)
(52) U.S. Cl. .................... 137/614.2; 137/613
(58) Field of Classification Search ............. 137/614.2, 137/613
See application file for complete search history.

(56) References Cited

U.S. PATENT DOCUMENTS 5,301,710 A * 4/1994 Marandi ................. 137/15.05
6,550,495 B1 * 4/2003 Schulze ................. 137/614.2

OTHER PUBLICATIONS

Griswold Controls; Specification Sheets; various valve products, 14 pages.

* cited by examiner

*Primary Examiner*—Kevin Lee
(74) *Attorney, Agent, or Firm*—E. Victor Indiano; Indiano Vaughan LLP (57) ABSTRACT

A valve is provided for use in a domestic water re-circulation system The valve has a unitary body member that includes an upstream end and an upstream portion disposed adjacent to the upstream end. The body member also includes a downstream end and a downstream portion disposed adjacent to the downstream end; and a middle portion disposed between the upstream portion and the downstream portion. A radially outwardly facing outer wall and a radially upwardly facing inner wall exist. The radially inner facing wall defines an axially extending passageway extending between the upstream end and the downstream end, and through the upstream portion, middle portion and downstream portion of the body. The axially extending passageway includes a corresponding upstream end, a downstream end, an upstream portion, a middle portion and a downstream portion. The body further includes a radially extending controller port and a radially extending flow limiter port in fluid communication with the axially extending passageway.

21 Claims, 5 Drawing Sheets

WATER RE-CIRCULATION VALVE

I. PRIORITY CLAIM AND TECHNICAL FIELD OF THE INVENTION

The present application claims priority to U.S. Provisional application No. 60/523,954, that was filed on 24 Nov. 2003.

The present invention relates to valves, and more particularly, to a valve for use in a water re-circulation system such as a heating or cooling system coil system or a domestic water system.

II. BACKGROUND OF THE INVENTION

Running water is an element of life that is taken for granted by persons who are fortunate enough to reside within the developed countries of the world. Most buildings include a system for delivering water from a water main to various points within the building having water outlets, from which the water can be drawn for use.

Most residential and smaller buildings have a one-way water circulation system, wherein water is brought into the building from a nearby water main, and then directed by pipes to the various water outlets. For example, it is common within a single family residential dwelling for a water pipe to extend between the dwelling and the main, and bring water into the interior of the dwelling. Once inside the dwelling, the water is divided between the cold water circulation and the hot water circulation systems. Water that is directed into the hot water circulation system is typically directed to a water heater wherein the water is heated. A pipe emerges from the water heater that then directs the water to the various outlets. To accomplish this, the hot water pipe may have several branches to serve all of the various water outlets.

In a residential type system of the one described above, water that is directed to a particular outlet is not returned to the water heater. Rather, the hot water circulation system has its terminus at one or more of the water outlets. The number of termini that any circulation system has depends upon the number of branches of the circulation system that exits, that, is largely determined by the number of outlets within the dwelling, and the location of the outlets within the dwelling.

One difficulty with such a one-way circulation system, especially when applied to hot water systems, is that over time, hot water that is fed into the water circulation branches will tend to cool. For example, if no one draws any water from a faucet during the night, the first person who wakes up in the dwelling in the morning, and attempts to take a shower will be met with cold water flowing out of the shower head. Such cooling is to be expected, as the ambient temperature surrounding the pipes is generally much less than the typical temperature (e.g. 120 degrees) to which the water heater heats the water.

In order to obtain hot water, the user must run water from the faucet to purge the water that has been resident in the hot water pipes overnight. The water must be run until this pipe-resident water has been purged from the pipe, and replaced with newly delivered water that is concurrently being drawn from the hot water heater. In most residential dwellings, the wait for hot water presents only a minor inconvenience, as the size of most dwellings, and the concomitant volume of water within the pipes is small enough so that only a relatively small amount of water is wasted, and the wait is relatively short.

Although a single circulation system works well for most smaller buildings, certain situations exist wherein a one-way circulation system is highly undesirable. One such situation involves larger buildings wherein the distance between the hot water heater and the outlets is large, and the volume of water in the circulation pipes is great. This is the situation as one would encounter in a large office building. This undesirable situation is exacerbated in large buildings with multiple water outlets, such as hotels and motels.

To overcome the limitations of a one-way circulation system in buildings such as hotels, a loop type re-circulation system is employed wherein water from the water heater is delivered to a hot water outflow pipe, that then delivers the water to the various outlets within a hotel. A return pipe is also provided for returning unused hot water back to the water heater, wherein the water can be reheated and redelivered to the hot water outflow pipe. Through this vehicle, water is circulated constantly within the hot water system, so that, at least in theory, hot water is present at all locations at all times within the re-circulating loop hot water system.

As will be described in more detail in the Detailed Description portion of the application, a re-circulation loop hot water system typically includes several "branches". These branches are often referred to as risers, as they usually extend vertically at a particular point in the building, which point usually coincides with the water outlets for the rooms on different floors.

One difficulty with serving such a multi-branched re-circulation loop is that all of the branches may not be served evenly. For example, those branches that are furthest away from the heater are less likely to receive their fair share of hot water than those branches that are located closer to the hot water heater. To help equalize the flow among branches, flow limiter valves are often inserted in each branch, that limit the amount of water that can flow out of a particular branch. These flow limiters are typically placed at the downstream end of each branch, so that the water entering the branch is not limited, but that the water leaving the branch is. These flow limiters are typically designed to permit water to flow out of the branch at a pre-determined volumemetric rate, such as 1 to 5 gallons per minute. Although currently existing flow limiter valves are capable of performing their designated tasks in a workman-like manner, room for improvement exists.

In particular, room for improvement exists in reducing the complexity of currently existing flow control valves containing flow limiters. Current practice is to employ a flow control valve in connection with a flow limiter valve and check valve, wherein the three components are in separate housings that must be joined together.

One object of the present invention is to provide a valve for use in a re-circulation system that incorporates a flow control valve, one-way valve, and flow limiter valve within a unitary housing.

III. SUMMARY OF THE INVENTION

In accordance with the present invention, a valve is provided for use in a domestic water re-circulation system. The valve comprises a unitary body member that includes an upstream end and an upstream portion disposed adjacent to the upstream end. The body member also includes a downstream end and a downstream portion disposed adjacent to the downstream end; and a middle portion disposed between the upstream portion and the downstream portion. A radially outwardly facing outer wall and a radially inwardly facing inner wall exist. The radially inwardly facing wall defines an axially extending passageway extending between the upstream end and the downstream end, and through the upstream portion, middle portion and downstream portion of the body. The axially extending passageway includes a corresponding upstream end, a downstream end, an upstream portion, a middle portion and a downstream portion. The body further includes a radially extending controller port and a radially extending flow limiter port in fluid communication with the axially extending passageway.

In a preferred embodiment of the present invention, a user actuable valve is disposed in the downstream portion, adjacent to the controller port, and a controller is disposed in the controller port and is mechanically coupled to the user actual valve member, for permitting the user to move the user actuable valve between an open and closed position.

Additionally, a flow limiter valve can be disposed within the flow limiter port. The flow limiter valve preferably extends into the middle portion of the axially extending passageway to cause fluid flowing through the axially extending passageway to flow through the flow limiter valve.

Also, in a preferred embodiment, a one-way valve is insertable in the upstream portion of the passageway that permits water to flow into the passageway from the piping upstream thereof, but prevents the flow of water out of the passageway.

Further, the body member can include first and second radially extending test ports. The first test port is preferably disposed upstream of the flow limiter valve, and the second test port is disposed downstream of the flow limiter valve. A first and second pressure tester can be inserted in the first and second test ports, respectively, to measure the water pressure upstream and downstream of the flow limiter valve, respectively. Through this, the pressure drop across the flow limiter valve can be determined.

One feature of the present invention is that the body portion is a unitary body, that is capable of containing a ball valve, a flow limiter valve, a one-way valve, and a pair of test ports. This feature has the advantage of providing the unitary structure for containing the primary flow components that are required for the device.

To further aid in servicing the invention, another feature of the present invention is that the flow limiter valve is removable from the body member. A flow limiter valve is preferably a cartridge type, that is inserted in the flow limiter valve port. A cap member is disposed on the end of the port to encase the flow limiter valve within the port. When servicing is required, the cap can be removed, to thereby enable the user to gain access to the flow limiter valve and remove it, and, if necessary replace it with a new flow limiter valve. Importantly, this service operation can be performed without the need for removing the body member.

A further feature of the present invention is that it includes a one-way valve that permits water within the particular riser in which the body member is disposed to only flow in an upstream-to-downstream direction, and which prevents back flow. By ensuring a one-way flow, the operation of the re-circulation system is enhanced by helping to better ensure that hot water is distributed equally among all of the branches, and that potentially relatively colder water that is contained within the return pipe of the re-circulation system does not flow backward into a riser, to thereby deliver relatively colder water to water outlets served by the particular riser.

The test ports help to enable the user to better evaluate the performance of the system, and diagnose problems within the re-circulation system. For example, a significant pressure drop across the flow limiter valve could be indicative of a situation wherein the flow limiter valve was clogged, and in need of replacing.

These and other features of the present invention will become apparent to those skilled in the art, upon a review of the Drawings and Detailed Description presented below, that describe the best mode of practicing the present invention perceived presently by the applicant.

V. DETAILED DESCRIPTION

Figure 2:
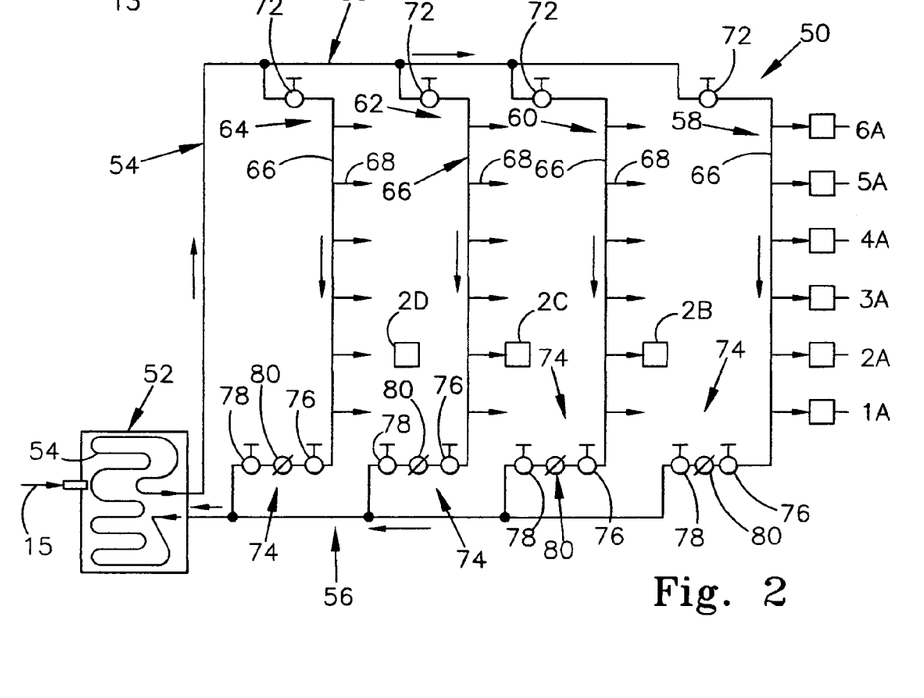
FIG. 2 is a schematic view of a down-feed-type domestic hot water re-circulation system of the type with which the present invention can be used.
Figure 3:
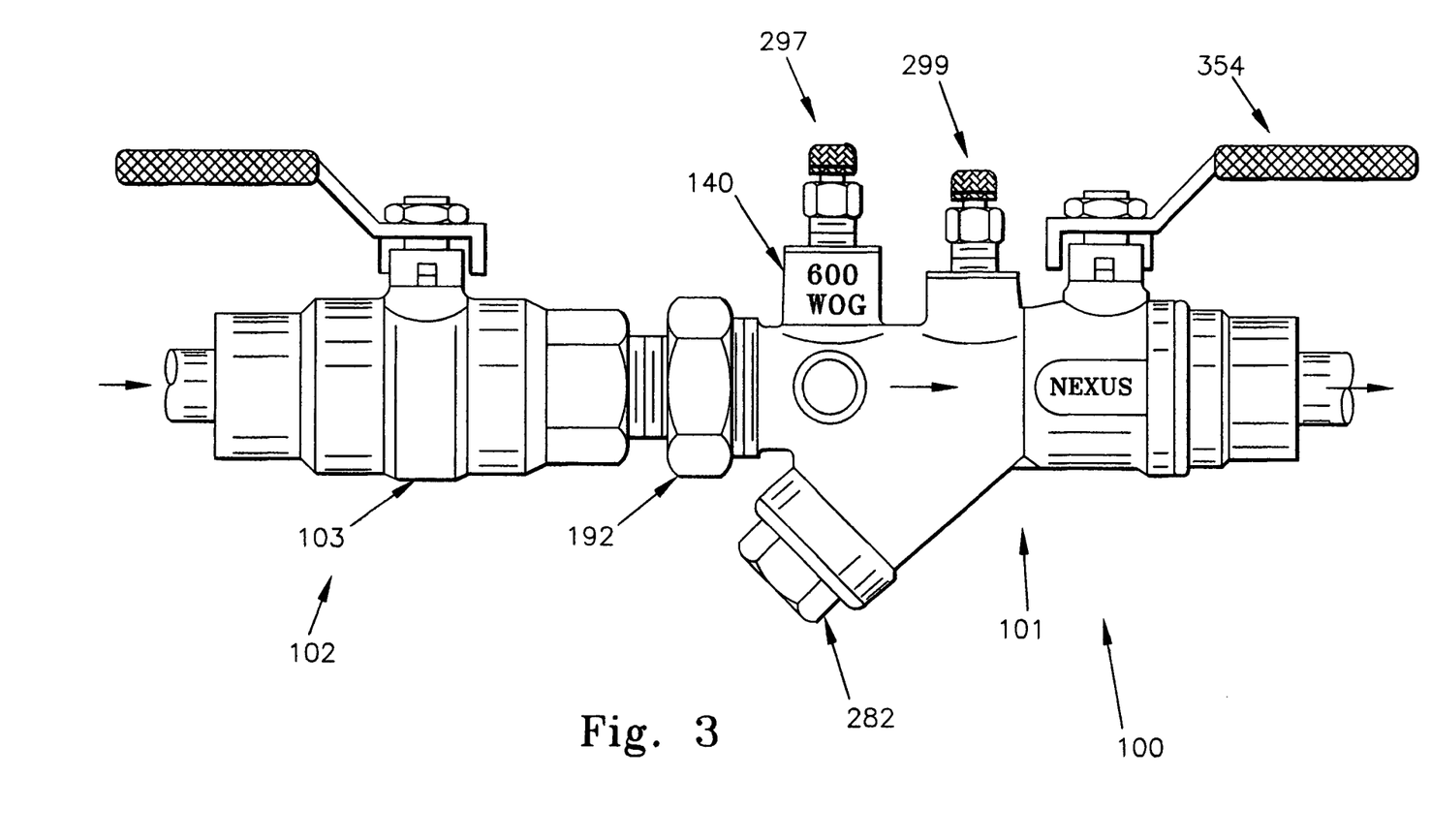
FIG. 3 is a side view of a domestic water re-circulation system valve of the present invention.
Figure 4:
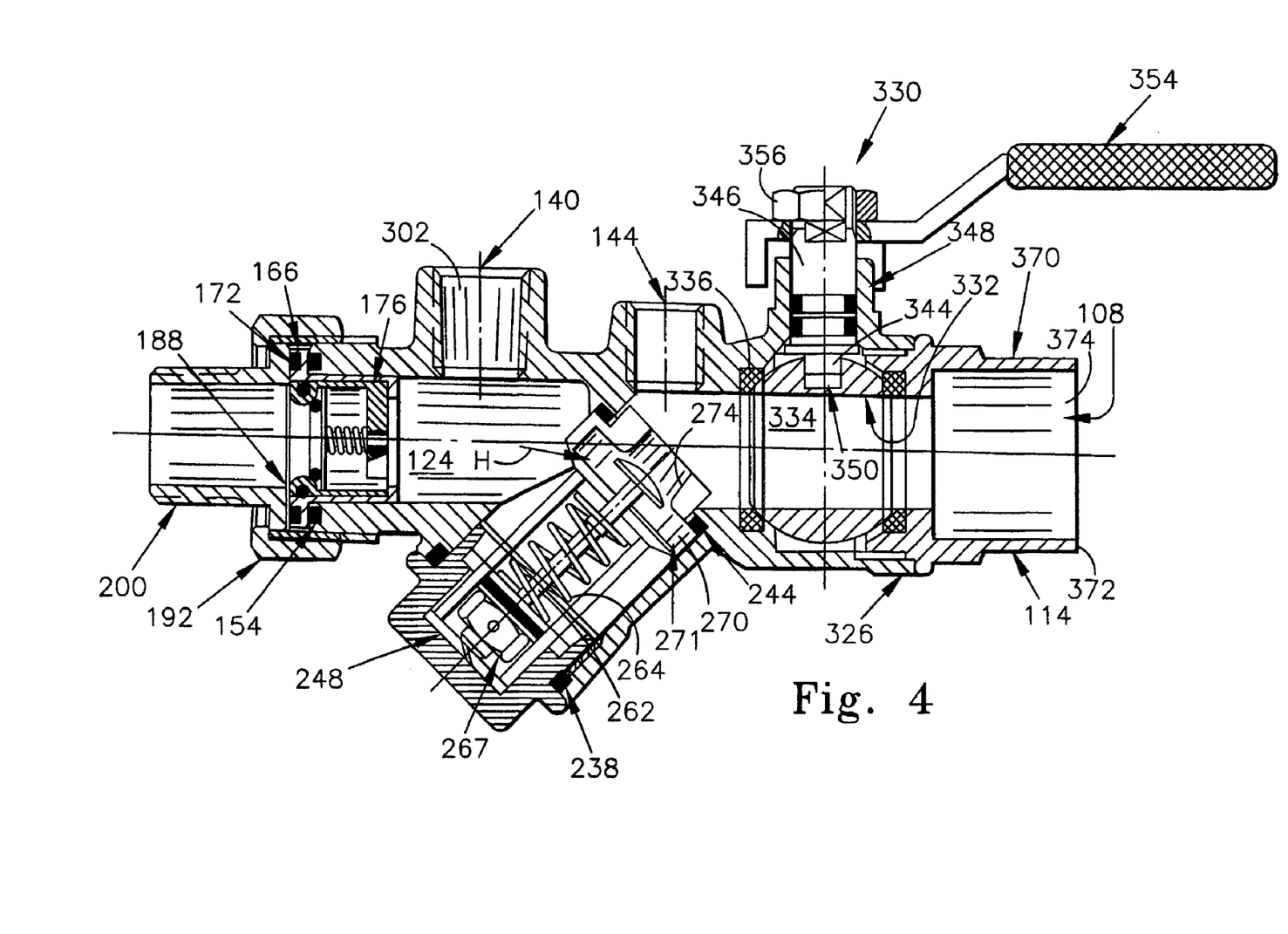
FIG. 4 is a sectional view of a valve of the present invention.
Figure 5:
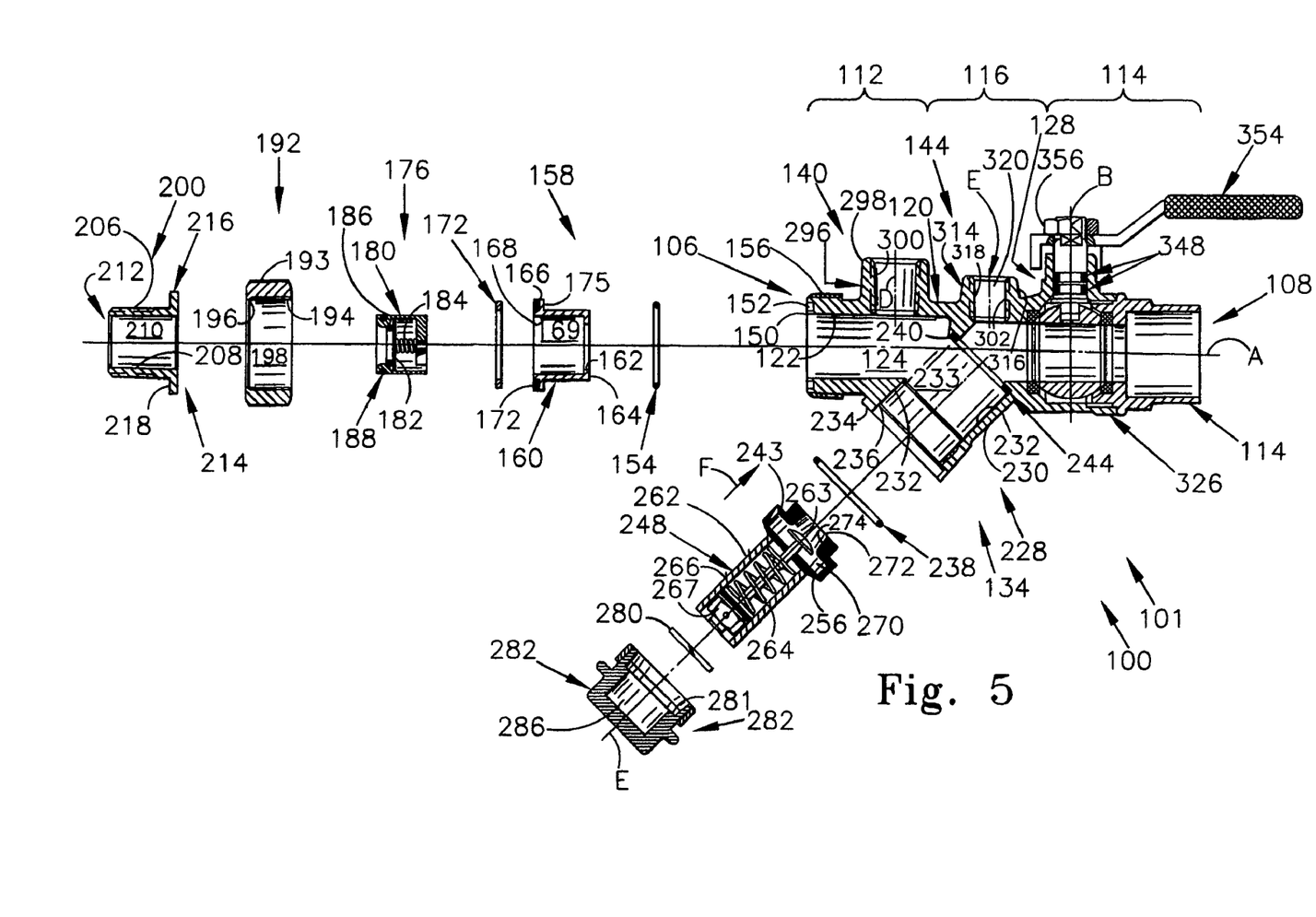
FIG. 5 is an exploded, sectional view of the valve of the present invention.

The valve 100 of the present invention is shown in FIGS. 3–5. However, before discussing the valve 100, it is first important to understand the environment in which it is used. To this end, an up-feed-type domestic hot water re-circulation system 10 is schematically shown in FIG. 1, and a down-feed-type domestic hot water re-circulation system is schematically shown in FIG. 2.

Figure 1:
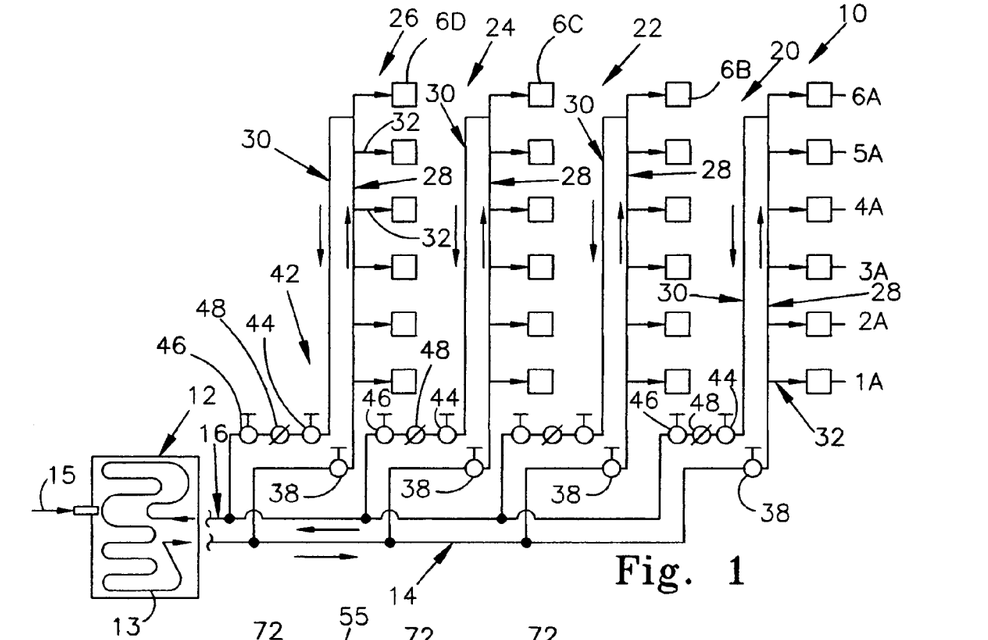
FIG. 1 is a schematic view of a up-feed-type domestic hot water re-circulation system of the type with which the present invention can be used.

Turning first to FIG. 1, an up-feed-type domestic hot water system 10 includes a water heater 12, having a heating coil 13 disposed therein, for heating the water that flows through the heating coil 13. An outflow pipe 14 conducts water away from the water heater 12, and a return pipe 16 returns water to the water heater 12. The re-circulation system 10 re-circulates the water, so that the water 16 that flows through the risers of the re-circulation system 10 is directed into the return pipe 16 from which it is returned to coil 13, to be reheated, and then returned to outflow pipe 14. A fresh water source 15 must be provided to supply fresh water to the coil 13, to replace the water that is lost through use.

The outflow pipe 14 feeds water to a plurality of risers. In the schematic view of FIG. 1, there are four (4) risers shown, including first riser 20, second riser 22, third riser 24, and fourth riser 26. Each of the four risers 20–26 of the upfeed system 10 shown in FIG. 1 include a delivery segment 28, and a return segment 30. A plurality of outlets 32 branch off the delivery segment 28, to deliver water to water outlets, such as shower heads, faucets and the like within particular rooms.

As alluded to above, most buildings are constructed so that a particular riser, such as riser 20 extends generally vertically in a particular place, to serve a plurality of rooms that are located directly above and below each other. As shown in the drawings, riser 20 serves rooms 1A–6A that are hypothetically located directly above each other, on the first (room 1A) through sixth (room 6A) floors of the building.

Different rooms on the same floor, such as rooms 6A, 6B, 6C, and 6D are served by different risers. Additionally, the building may be designed, so that a particular riser, such as riser 20 serves two rooms, on a particular floor that are located adjacent to each other. For example, the riser 20 may pass through a common wall between rooms 1A, and its adjacent room (not shown). In such a case, the riser may include a pair of outlets 32, with one outlet being directed to room 1A, and the second outlet being directed to its adjoining room.

Each riser also includes an upstream riser valve 38, that is disposed at the upstream portion of the delivery segment. Upstream riser valve 38 is preferably a user actuable, flow control valve, such as a ball valve. Flow control valves of this type typically have a user actuable handle, or an automatic mechanism that permits the valve to be moved between an open position, wherein water can flow through the valve, and hence the riser 20, and a closed position, wherein water is shut off to the riser 20.

The purpose of having an upstream valve 38 such as the flow control valve 38 is to permit the user to shut off the flow of the water to the riser 20, should servicing be necessary. For example, if a pipe within the riser 20 should burst, it would be advisable to close the upstream valve 38 to prevent further water from flowing out of the burst pipe, and thereby causing additional water damage to the area adjacent to the burst pipe.

Each riser also includes a downstream valving system 42, that is disposed in a downstream portion of the return segment 30, just upstream of the junction of the downstream segment 30 with the return pipe 16. The downstream valving segment 42 includes a first user actuable valve 44, and a second user actuable valve 46. A flow limiter valve 48 is preferably disposed between the first and second user actuable valves 44, 46. The first and second user acutable valves 44, 46 are preferably ball type flow control valves that are similar in configuration to the flow control valve used in connection with the upstream riser valve 38.

A flow limiter valve 48 is a valve that is designed to permit water to flow through the valve at a predetermined flow volume, such as 1 gallon per minute (gpm), 5 gpm, & 10 gpm, etc. Most flow control valves are designed to permit the predetermined volume of water to flow through the valve over a wide variation of pressures upstream and downstream from the flow limiter valve 48. As discussed above, flow limiter valves 48 are employed so that hot water is equally distributed among the risers 20–26. Without the user of a flow limiter valve 48, it is likely that the riser 26 closest to the water heater 12 would be over-served by hot water, due to its proximity to the water heater 12, and the first riser 20 would be under-served by the water heater 12, due to its relatively larger distance from the water heater 12. This over served and under served condition can result in the water within the closest riser 26 being normally at a substantially higher temperature than the water within the most distant riser 20.

A down-feed-type domestic hot water re-circulation 50 is shown in FIG. 2, and includes a water heater 52 having a coil 53 contained therein. An outflow pipe 54 delivers water from the water heater 52, and a return pipe directs return water back into the water heater 52.

In the system 50 schematically represented in FIG. 2, the system 50 contains four risers, including first riser 58, second riser 60, third riser 62, and fourth riser 64. The risers 58–64 differ from the risers 20–26 of the system 10 shown in FIG. 1, as the risers 58–64 only include a delivery segment 54, but no return segment. Water that flows through the risers 58–64 is returned to a common return pipe 56. The delivery segments include a plurality of outlets 68, that are provided for servicing various rooms, or water outlets within a room.

Similar to the risers 20–26 of FIG. 1, the risers 58–64 of the down feed system extend generally vertically. Water that emerges from the water heater 52 travels up a common delivery pipe 54, to a common delivery segment 55, that runs horizontally, between the four risers 58–64, to deliver water to each of the four risers 58–64.

Each of the risers 58–64 includes an upstream valve 72 that performs the same function as upstream valve 38; and a downstream valving system 74. The downstream valving system 74 includes a first user actuable flow valve 76, a second user actuable flow valve 78 and a flow limiter valve 80, that can be generally similar, if not identical in configuration, and perform generally the same function as their counterparts in the upfeed system 10.

The domestic water re-circulation valve 100 of the present invention is shown in FIGS. 3–5 as being coupled to a separate, user actuable valve 102. As best shown in FIGS. 3–5, the valve 100 has a generally cylindrical body 103 that includes an upstream end 106 into which water flows in the valve 100, and a downstream end 108 from which water flows out of the valve body 103. An upstream portion 112 is disposed adjacent to the upstream end 106, a downstream portion 114 is disposed adjacent to the downstream end 108, and a middle portion 116 extends between the upstream portion 112 and downstream portion 114.

The body 103 includes a radially outwardly facing exterior surface 120, and a radially inwardly facing surface 122 that defines an axially extending passageway 124 that extends throughout the entire length of the valve 100 from the upstream end 106 to the downstream end 108. The axially extending passageway 124 includes a primary axis A.

The body 103 includes several intermediate ports including a radially extending controller port 128 into which a valve controller can be placed. The radially extending controller port 128 is disposed in the downstream portion, and includes a major axis B, that is perpendicular to, and intersects the primary axis A of the axially extending passageway 124.

A flow limiter port 134 is disposed approximately 180 degrees from the radially extending controller port 128, and has a primary axis C, that is disposed in a non-parallel relation with the primary axis A of the axially extending passageway. Preferably, axis C is disposed at an oblique angle to the primary axis A, so that axis C forms an acute angle with the portion of axis A disposed upstream from the intersection of axes A and C, and an obtuse angle with the portion of axis A downstream from the intersection of axis C and A. Preferably, the angle of the intersection of axis C and axis A, is between 30 and 60 degrees, and most preferably, about 45 degrees.

The placement of the flow limiter port 134 at an oblique angle such as that described above helps to foster the smooth flow of water from the upstream portion through the flow limiter valve. By contrast, placing the flow limiter port at a perpendicular angle to axis A would tend to restrict flow through the flow limiter valve, and thus detract from the performance of the valve 100.

First and second radially extending test ports 140, 144 are disposed in the middle portion of the valve 100, and contain axes D and E respectively, that are parallel to each other, and parallel to axis B of the controller port 128. Each of the first and second test ports 140, 144, and flow limiter port 134 are in fluid communication with the axially extending passageway 124. Controller port 128 has the capability of being in fluid communication with the axially extending passageway 124, but is not, due to the presence of the ball valve of the flow control valve that is fixedly coupled to the controller that is placed within the controller port 128.

The body 103 of the valve 100 is unitarily formed, from one piece of a water tolerant metal, such as brass, that is capable of withstanding the pressures exerted within the re-circulation system, and that will not rust or decay in a water environment. Although a brass alloy is preferred because it provides these desired characteristics at a reasonable price, stainless steel could also be employed, as, most likely, could some appropriate plastic material.

The upstream end 101 of the valve body 103 includes a radially extending end surface 150, that contains an annular groove 152 formed thereon. The annular groove 152 is sized and configured for receiving an annular O-ring 154, to provide an appropriate seal. The radially outwardly facing surface 120 of the valve body 103 includes a threaded radially outwardly facing portion 156 that is disposed adjacent to the upstream end 106 of the valve body 103. The threaded radially outwardly facing 156 surface is provided for receiving the inner threads of the retaining nut 192.

A cup-shaped adaptor 154 receives a one-way valve 176, and is sized and configured to be received within the upstream portion 112 of the axially extending passageway 124. The cup-shaped adaptor 154 includes a generally cylindrical body 160, having a downstream end 164 that includes an aperture 163 through which fluid can pass. The upstream end of the adaptor 154 includes a radially outwardly extending flange 166, that defines a central opening 168, that connects through the interior passageway 169 with a downstream aperture 162 of the downstream end 164. The flange 166 also includes an annular groove 170 for receiving an O-ring 172. The underside surface 175 on the flange 166 is sized and configured for butting up against the O-ring 154, and the radially extending end surface 150 of the body portion 104 of the valve 100.

The one-way valve 176 is sized and configured for being received within the interior passageway 169 of the cup-shaped adaptor 158. The one-way valve 176 includes a generally cylindrical housing 180 in which is contained a valve head 182, and a biasing means, such as spring 184 for biasing the valve head 182 into engagement with a radially inwardly extending valve seat 186. The radially outwardly facing surface of the housing 180 includes an annular groove, for receiving a circumferential O-ring 188.

The one-way valve 176 permits water to flow in an upstream-to-downstream direction (left to right in FIGS. 4 and 5), but prevents the flow of water in an upstream direction. The one-way valve 176 ensures that water flowing through the riser in which the valve 100 is placed, flows in the appropriate direction, from the delivery pipe to the return pipe, and not backwards. By ensuring that water flows in the correct direction, the one way valve 176 facilitates servicing of the valve 100 and helps to ensure an appropriate distribution of water among the various risers within the domestic hot water re-circulation system in which the valve 100 is placed.

The retaining nut 192 is provided for retaining the one-way valve 176 and adaptor cup 154 within the valve body 103, and for retaining the tail piece 200 onto the valve body 100. The retaining nut 192 has a hex-shaped radially outwardly facing surface 193 so that it may be rotated with a wrench; and a threaded inner surface 194. The threads of the threaded inner surface 194 are sized and configured for threadedly receiving the threaded outer surface 156 of the valve body 103. A radially inwardly extending retaining lip 196 is sized and configured for receiving the axially upstream facing surface 218 of the flange portion 216 of the tail piece 200, for retaining the tail piece onto the body 103.

The tail piece 200 includes a generally cylindrical body 202, having a radially outwardly facing surface 206 and a radially inwardly facing surface 208, that defines an axially extending passageway 210 through which fluid can flow. The tail piece 200 includes an upstream end 212 and a downstream end 214. Upstream end 212 is configured for receiving, or being received by a plumbing component, such as a pipe, or user actuable valve 102 that is disposed upstream in the system from the valve 100.

A radially outwardly extending flange 216 is disposed at the downstream end 218, and is sized and configured for being received within the retaining nut 192. The diameter of the flange 216 is such so that the diameter is slightly smaller than the diameter of the major extent of the axially extending passageway 198 of the retaining nut 192. However, the diameter of the flange 216 is sized to be larger than the diameter of the retaining lip 196 of the retaining nut 192, so that the axially upstream facing surface 218 of the tail piece can rest against the retaining lip 196, to maintain the tail piece 200 onto the retaining nut 192, and thereby, maintain the tail piece 200 in a mechanically coupled relation with the body 101 of valve 100.

The flow limiter port 134 includes a cylindrical wall 228 that extends obliquely to the axis A of the axially extending passageway 124. Because of the oblique angle at which it extends, it will be noted that the length of the wall portion is greater, on its downstream side, than on its upstream side. The cylindrical wall 228 includes a generally cylindrical outer surface 230 and a generally cylindrical inner surface 232, that defines an obliquely extending passageway 233, having an axis E. As mentioned above, the angle between axis E of the obliquely extending passageway 233 and the axis A of the axially extending passageway 124, is preferably between about 30 and 60 degrees, and optimally, at about 45 degrees.

The cylindrical wall 228 includes an outer end 234, and a recessed lip 236 that is disposed adjacent to the outer end 234. The recessed lip 236 is provided for receiving an O-ring 238. A circumferential, radially outwardly facing annular shoulder 240 is formed at the inner-most point of the obliquely extending passageway 233. The shoulder 240 is formed as a part of the inner surface 122 of the body portion 103. The shoulder 240 is formed for holding a washer-shaped gasket 244, that is sized and positioned for receiving the inwardly facing shoulder 233 of a flow limiter valve 248.

Figures 6, 7:
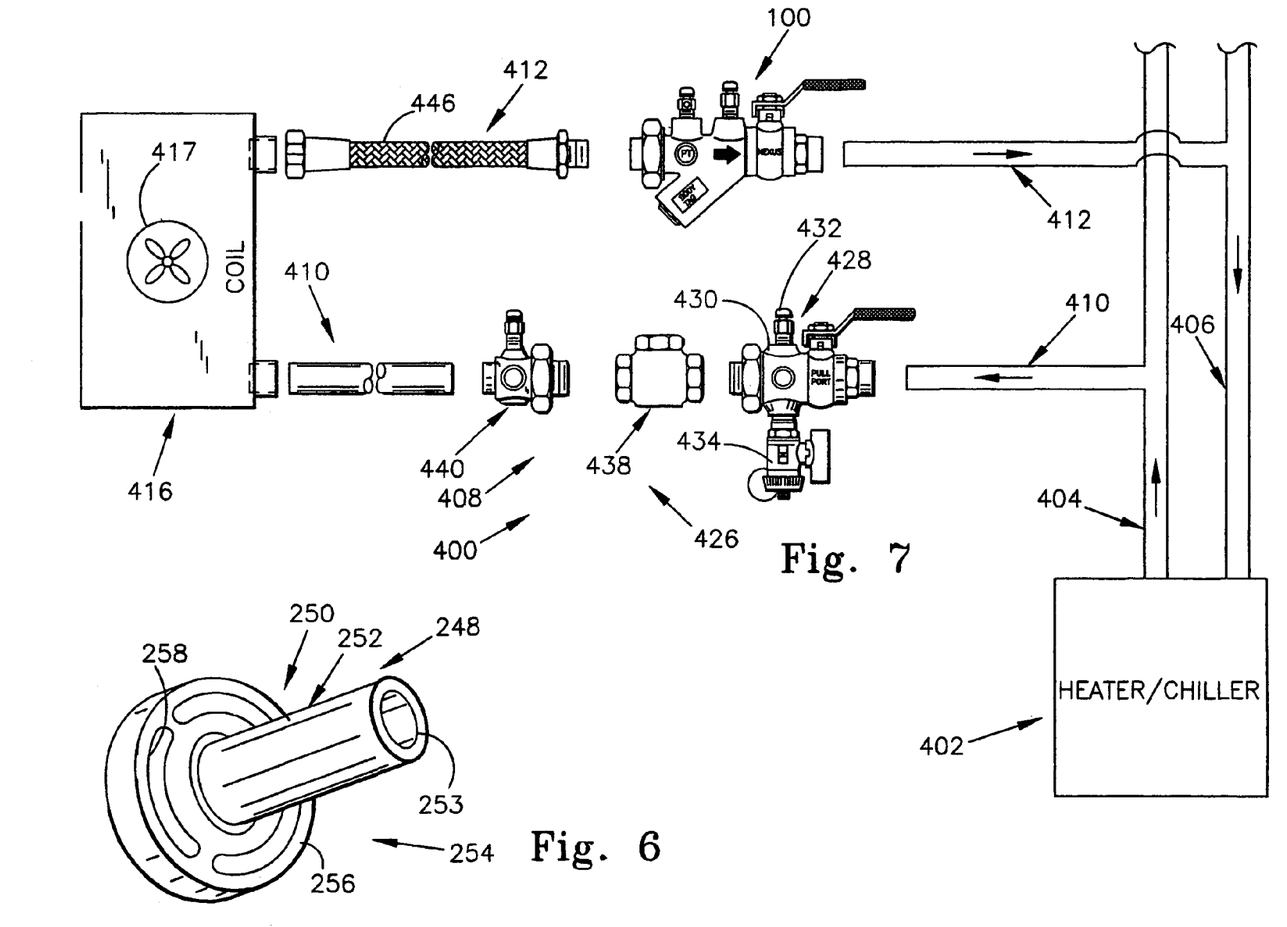
FIG. 6 is a perspective view of a flow limiter valve of the present invention.
FIG. 7 is a schematic view of a water re-circulation system of the type used in heating and/or cooling a building, showing the present invention therein.

Flow limiter valve 248 is best shown in FIGS. 4–6 as including a housing 250 having an outwardly positioned, cylindrical smaller diameter portion 252, having an outer end 253. The housing 250 also includes an inwardly disposed cylindrical larger diameter portion 254. The larger diameter portion 254 includes a radially outwardly facing surface 256 that includes a plurality of apertures 258, formed therein.

Within the interior of the smaller diameter portion 252 is a valve stem, that is positioned to extend along axis E. A biasing spring 264 serves to bias the valve head 263 and valve stem 262 in a direction opposite to the direction shown by arrow F. A spring seat 266 is positioned at the outward end of spring 264. An adjustment nut 267 is placed outwardly of the valve seat 266 and is provided for adjusting the position of the valve stem 262, and hence the valve head 263. Valve head 263 is fixedly coupled to the valve stem 262.

The valve head 263 is contained within the larger diameter portion 254, and is disposed within the inner chamber 271 within the larger diameter portion 254. The inner chamber 271 includes an upstream portion 270, that is disposed generally upstream of the valve head 263, and an outflow aperture 272 that is disposed downstream of the valve head 263. The outflow aperture 272 includes a tapered wall 274 that has a diameter that decreases as one moves down stream in the outflow aperture 272 in a direction indicated by arrow F.

In operation, water that is in the middle portion 116 of the axially extending passageway 124 that is upstream of the flow limiter valve 238, cannot continue its flow downstream in the axially extending passageway 124, without passing through the flow limiter valve 248. As best shown in FIG. 4, water that is in the same position as that designated by letter H, within the axially extending passageway 124 follows the direction of arrow H, through the apertures 258 of the flow limiter valve 248, and into the upstream portion 270 of inner chamber 271. When in the upstream portion 270, the water exerts a pressure against the valve head 263, to move the valve head 263 in a direction indicated generally by arrow F (FIG. 5). This pressure causes the valve head 263 to move into the outflow aperture 272.

The distance to which the valve head 263 will move into the outflow aperture 272 is determined by the amount of pressure exerted against the valve head 263 by water in the upstream portion 270, with greater pressures, causing the valve head 263 to more further into the aperture 272, as in a direction indicated by arrow F of FIG. 5. Counter-balancing the exertion of pressure that causes the valve head 263 to move in direction F, is the counter-directed pressure that is exerted by the biasing spring 264, and the pressure of the water in the outflow aperture 262, and in that portion of the axially extending passageway 124 downstream from the flow limiter valve 248.

The amount of water that can flow past the valve head 263 is determined largely by the size of the gap between the valve head 263, and the tapered walls 274. Due to the tapering of the walls 274, the diameter of the tapered aperture 272 decreases, as one moves downwardly through the aperture 272, in a direction as indicated generally by arrow F. As such, the size (area) of the gap between the valve head 263 and the tapered wall 272 decreases as the valve head 263 moves downwardly into the aperture 272. As the area of the gap decreases, the amount of water that can flow past the valve head 263 also decreases. As the distance that the valve head 263 will move is dependent upon the pressure of the water in the upstream portion 270 (which itself is dependent upon the pressure in the upstream portion of the axially extending passageway 124), it will be appreciated that the distance at the valve head 263 will move is directly proportional to the upstream pressure of the water in the upstream chamber 272. Similarly, the size of the gap between the head 263 and tapered walls 274 is inversely proportional to the pressure in the upstream portion 270.

The increased pressure of the water and the reduced size of the gap tend to counter-balance each other, so that the net result is that the amount of water that flows out of the aperture 272 remains reasonably constant (plus or minus 10%) over a wide range of normal operating pressures.

The amount of water that is normally permitted to flow through the outflow aperture 272 can be varied by varying the particular flow limiter valve 248. The flow through a flow limiter valve 248 can be changed by changing the relative sizings of the aperture and head, or by changing the force exerted by spring 264.

An O-ring 280 is provided for residing on a circumferential shoulder 281 that is formed in a cap member 282, that is used to seal off the end of the obliquely extending passageway 228. The cap member 282 includes threads for threadedly engaging the cylindrical walls of the obliquely extending flow limiter port 134. The cap includes an interior space 286 for receiving the outer end of the smaller diameter portion 252.

One feature of the flow limiter valve 248 and flow limiter port described above is that the port 134 construction of the body allows the valve 248 to be easily replaceable. To replace the flow limiter valve 248, water is shut off, so that it is no longer flowing through the axially extending passageway 124. This shut off can be accomplished through shutting off the water flow through the user actuable valve 102 and the flow control valve 330. Cap 282 can then be removed from its engagement with the obliquely extending cylindrical walls 228, and the flow limiter valve 248 can be removed and replaced with another unit. The cap 282 is then replaced onto the obliquely extending cylindrical walls 228 of the flow limiter port 134 to resume operation.

The first test port 140 includes a radially extending cylindrical wall 296, having a radially outwardly facing surface 298, and a radially inwardly facing surface 300. The radially inwardly facing surface 300 defines a radially extending first test port passageway 302 that is in fluid communication with the axially extending passageway 124 of the body 103. The cylindrical wall 296 is unitarily formed with the body 103, and is sized and configured for receiving a pressure measurer, such as a pressure testing device 297 that is insertable through the radially extending passageway 302 into the interior of the axially extending passageway 124, to measure the pressure within the passageway 124.

Turning now to FIG. 4, it will be appreciated that a pressure measurer 297 that would extend through the radially extending passageway 302 would extend into the axially extending passageway so that its distal end would be disposed in the middle portion of the axially extending passageway, and in a position upstream of the flow limiter valve 248. A cap (not shown) can be stationarily coupled to cylindrical wall 296 to prevent water from flowing out of the first test port 140.

The second test port 144 is generally similar, but somewhat smaller than the first test port 140, and includes a radially extending cylindrical wall 314 having a radially outwardly facing surface 316, and a radially inwardly facing surface 318. The radially inwardly facing surface 318 defines a radially extending test port passageway 320 that is in fluid communication with the axially extending passageway 124. Second test port 310 is also designed and configured for receiving a pressure testing device 299, so that the end of the test device 299, when placed in the second test port 144, is positioned in the axially extending passageway 124 at a position downstream from the flow limiter valve 248.

Pressures from the first 297, and second test measurers 299 can be taken to help the user determine the pressures upstream and downstream of the flow limiter valve 248, and through simple calculations, determine the pressure drop across the flow limiter valve 248.

The body 103 also includes a valve containment portion 326 that is disposed in the downstream portion of the body, 103, and is sized and configured for retaining a user actuable flow control valve 330. Flow control valve 330 is shown in the figures as being a user actuable ball valve type flow control valve 330 having a ball member 332 that resides within the axially extending passageway 124.

The ball member 332 includes an axially extending passageway 334, and is rotatably movable between an open position, wherein the axially extending passageway 334 of the ball member 332 is disposed co-linearly with the axially extending passageway 124 of the body; and a closed position wherein the ball member 332 is rotated 90 degrees, so that the axially extending passageway is disposed generally perpendicular to the axially extending passageway 134. When in the closed position, a side surface of the ball member 332 faces the axially extending passageway 124, and prevents water from flowing past the ball member 332. First and second O-rings 336, 338 are disposed on either side of the ball member to provide an appropriate seal.

A controller member 342 is fixedly positioned, and rotatably moveable within the controller member 128. The controller member 342 includes a centrally disposed control shaft 314, that is rotatable with respect to an exteriorly and concentrically disposed sleeve 346. A pair of O-rings 348 are provided for sealingly engaging the controller member 342 within the control port 128, to prevent water from leaking out of the controller port 128.

The control shaft 350 includes a distal key portion 350 that is engagable with a correspondingly shaped recess in the ball member 332, so that rotation of the distal key 350, and hence rotation of the control shaft 344 rotates the ball member 332 between its opened and closed position. The control shaft 350 also includes a proximal key 352 that is disposed exteriorly of the body 103. Proximal key 352 is sized and configured to be received by a correspondingly sized and shaped aperture in a user actuable handle 354. The user can employ the handle 354 to rotate the control shaft 344 to move the ball member 332 between its open and closed position. A retaining nut 356 fixedly couples the handle 354 to the control shaft.

The controller port 128 is generally similar to the test ports, as it contains a generally cylindrical wall 358 that stands radially outwardly from the body 103, and that is formed unitarily with the body 103. The cylindrical wall includes a radially extending outer surface, and a radially extending inner surface that defines a radially extending passageway 364 in which the controller member 342 resides.

The downstream end 108 of the body includes a mating portion 370 including the downstream end 372, and a downstream opening 374. The downstream mating portion 370 is sized and shaped to be mated with a pipe member within the re-circulation system downstream of the valve 100.

In operation, the device is assembled, and placed in its appropriate position within a riser of a building. Water flows through the tail pipe 202, and through the one-way valve 176. Water then flows into the axially extending passageway 124, and past the point where the first test port joins with the axially extending passageway 124. Water then flows in a direction indicated generally by arrow H, through the flow limiter valve, and past the valve head 263, and out the outflow aperture 272. The passage of water through the flow control valve limits the amount of water that can pass through the axially extending passageway 124 of the valve. If the user actuable valve 330 is in its open position, water can then flow into the downstream portion of the valve, and out the end of the valve, and back to the return pipe thereof.

The valve 100 of the present invention is shown in FIG. 7 as being installed within a heating or cooling re-circulation system 400. The heating and cooling re-circulation system, has several similarities to the domestic hot water re-circulation systems 10, 50 shown in FIGS. 1 and 2. In particular, water is re-circulated in a loop within the system 400. Additionally, the system 400 may contain several "branches" in a manner similar to the plurality of risers 20–26, shown in FIG. 1. However, the heating/cooling coil system 400 does not include a plurality of water outlets, from which water is drawn. As such, within the heater or cooling system 400, the same water is generally continuously re-circulated throughout the system 400, thus requiring a significantly smaller input of fresh water.

The heater/cooler re-circulation system 400 includes a heater/chiller 402 that is provided for heating or chilling the water that is circulated within the system 400. As an alternatives, some re-circulation systems employ a heater for heating water during the cold months, for providing heat to a building, and a separate chiller for chilling the water to provide air conditioning during the hot months.

The heater/chiller 402 includes an outflow pipe 404 that directs water into the system 400, and a common return pipe 406 that returns water back to the heater/chiller 402. Both outflow pipe 404 and return pipe 406 serve a plurality of branches, such as branch 408. Branch 408 includes a water delivery pipe 410, and a water return pipe 412.

The water delivery pipe delivers water to a heat exchanger coil 416 that may include a fan 417 for aiding in the movement of air across the coil 416. The water return pipe 412 delivers water that is passed through the coil 416 back to the return pipe 406, and then back into the heater/chiller 402, wherein the water is either re-heated (in a heater configuration) or chilled (in a chiller configuration).

Coil 416 can be configured similarly to a radiator, wherein the pipe that flows through the coil 416 includes a plurality of fins, that serve as heat sinks. The fan 417 pulls air across the fins, so that the air that is pulled across the fins is either heated or cooled, as desired. The heated/cooled air is then directed through ducts into building spaces.

The delivery pipe 410 includes an upstream valving system 426 that includes a user actuable valve 428 having a test port 430, in which a pressure test device 432 can be placed. A drain valve 434 is coupled to the user actuable valve 428 to permit water to be drained out of the system. A temperature control valve 438 is disposed downstream of the user actuable valve, and a full port union 440 is disposed downstream of the temperature control valve 438.

A flexible tube 446 is provided for coupling the valve 100 of the present invention to either the outflow port of the coil 416, or alternately, to a pipe that extends between the upstream end of the flexible tube 446 and the coil 416. The flexible tube 412 is provided to facilitate the changing of the check valve that is contained within the valve 100 of the present invention. The flexible tube 412 can be disconnected from the tail piece of the valve 100, and because of its flexible nature, moved aside to enable a service technician to gain access to the check valve that is disposed in the upstream portion of the axially extending passageway 124 of the valve 100. The downstream end of the valve 100 is coupled to the return line 412.

The valve 100 shown in FIG. 7 has the same components as is discussed above in connection with FIGS. 3–6, and serves, essentially, the same purpose as it does in the domestic water re-circulation system discussed above, in connection with FIGS. 1–6.

What is claimed:

1. A valve for use in a water recirculation system comprising a unitary body member including
   (a) an upstream end and an upstream portion disposed adjacent to the upstream end;
   (b) a downstream end and a downstream portion disposed adjacent to the downstream end;
   (c) a middle portion disposed between the upstream portion and the downstream portion;
   (d) a radially outwardly facing outer wall;
   (e) a radially inwardly facing inner wall defining an axially extending passageway extending between the upstream end and the downstream end, and through the upstream portion, middle portion and downstream portion of the body member, the axially extending passageway including a corresponding upstream end, downstream end, upstream portion, middle portion and downstream portion;
   (f) a controller port; and
   (g) a flow limiter port in fluid communication with the axially extending passageway
a flow limiter valve disposed in the flow limiter port, the flow limiter valve extending into the axially extending passageway to cause fluid flowing through the axially extending passageway to flow through the flow limiter valve, the flow limiter valve including
   (a) a housing defining an exterior and an interior, the housing including at least one aperture to permit fluid to flow from the axially extending passageway into the interior of the passageway;
   (b) an outflow aperture to permit fluid in the interior to flow back into the axially extending passageway, and
   (c) a closure member movable in relation to the outflow aperture, and
wherein fluid pressure passing through the housing interior exerts force on the closure member to move the closure member toward the outflow aperture to reduce the effective area of the outflow aperture to thereby control the amount of fluid that can flow back into the axially extending passageway.

2. The valve of claim 1 further comprising a user-actuable valve member disposed in the downstream portion adjacent to the controller port and a controller disposed in the controller port and mechanically coupled to the user-actuable valve member.

3. The valve of claim 2 wherein the controller includes a user actuable handle member mechanically coupled thereto and disposed exteriorly of the body member, for permitting a user to move the user actuable valve between an open and a closed position.

4. The valve of claim 1 wherein the flow limiter valve includes a spring coupled to the closure member for biasing the closure member away from the outflow aperture.

5. The valve of claim 1 further comprising a one-way valve disposed in the axially extending passageway in the upstream portion, the one-way valve being configured for permitting fluid to flow into, but not out of, the upstream end of the axially extending passageway.

6. The valve of claim 1 wherein the body includes:
a first radially extending test port disposed in the middle portion upstream of the flow limiter port and
a second radially extending test port disposed in the middle portion downstream of the flow limiter port.

7. The valve of claim 1 wherein the flow limiter port has a primary axis disposed at an oblique angle to the axis of the axially extending passageway.

8. The valve of claim 7 wherein the oblique angle of the main axis of the flow limiter port is an acute angle with respect to the axis of the axially extending passageway in the upstream portion.

9. The valve of claim 1 further comprising a one-way valve disposed in the axially extending passageway in the upstream portion, the one-way valve being configured for permitting fluid to flow into but not out of the upstream portion of the axially extending passageway and an adaptor member having an axially extending wall portion defining an interior passageway configured for receiving the one-way valve, and an exterior surface sized and configured for being received in the upstream portion of the axially extending passageway.

10. A valve for use in a water recirculation system comprising
   (1) a unitary body member including
      (a) an upstream end and an upstream portion disposed adjacent to the upstream end;
      (b) a downstream end and a downstream portion disposed adjacent to the downstream end;
      (c) a middle portion disposed between the upstream portion and the downstream portion:
      (d) a radially outwardly facing outer walk;
      (e) a radially inwardly facing inner wall defining an axially extending passageway extending between the upstream end and the downstream end, and through the upstream portion, middle portion and downstream portion of the body member, the axially extending passageway including a corresponding upstream end, downstream end, upstream portion, middle portion and downstream portion;
      (f) a radially extending controller port; and
      (g) a radially extending flow limiter port in fluid communication with the axially extending passageway;
   (2) a user-actuable valve member disposed in the downstream portion adjacent to the controller port;
   (3) a controller disposed in the controller port and mechanically coupled to the user-actuable valve member;
   (4) a flow limiter valve disposed in the flow limiter port, the flow limiter valve extending into the middle portion of the axially extending passageway to cause fluid flowing through the axially extending passageway to flow through the flow limiter valve; the flow limiter valve including an outflow aperture and closure member, the outflow aperture comprising an elongated tapered aperture having a diameter that decreases at increasing distances from the closure member, the closure member being moveable in relation to the outflow aperture to control the flow of fluid through the aperture; and a housing defining an interior and an exterior, the housing including at least one aperture to permit fluid to flow from the axially extending passageway into the interior of the housing and a spring coupled to the closure member for biasing the closure member away from the outflow aperture
wherein fluid pressure passing through the housing aperture exerts force on the closure member to move the closure member toward the outflow aperture to reduce the effective area of the outflow aperture through which fluid can pass into the axially extending passageway.

11. The valve of claim 10 wherein the closure member includes a stem portion and a head portion, the head portion having a diameter smaller than the diameter of the tapered outflow aperture to define a gap between the head portion and the tapered outflow aperture through which fluid can pass.

12. The valve of claim 11 wherein the body includes a first radially extending test port disposed in the middle portion upstream from the flow limiter valve and a second radially extending test port disposed in the middle portion downstream of the flow limiter valve.

13. The valve of claim 12 wherein the flow limiter has a primary axis that extends at an oblique angle to the axis of the axially extending passageway.

14. The valve of claim 13 wherein the oblique angle of the main axis of the flow limiter port is an acute angle with respect to the axis of the axially extending passageway in the upstream portion.

15. The valve of claim 13 wherein the angle of the axis of the flow limiter port and the axis of the axially extending passageway is between about 30 degrees and 60 degrees.

16. The valve of claim 12 further comprising a first pressure measurer insertable in the first test port for measuring fluid pressure in the axially extending passageway upstream of the flow limiter valve, and a second pressure measurer insertable in the second test port for measuring fluid pressure in the axially extending passageway downstream of the flow limiter valve.

17. The valve of claim 12 further comprising a removable cap member capable of being sealingly engaged to the flow limiter port for containing fluid within the axially extending passageway.

18. A valve for use in a water recirculation system comprising
(1) a unitary body member including
  (a) an upstream end and an upstream portion disposed adjacent to the upstream end;
  (b) a downstream end and a downstream portion disposed adjacent to the downstream end;
  (c) a middle portion disposed between the upstream portion and the downstream portion;
  (d) a radially outwardly facing outer wall;
  (e) a radially inwardly facing inner wall defining an axially extending passageway extending between the upstream end and the downstream end, and through the upstream portion, middle portion and downstream portion of the body member, the axially extending passageway including a corresponding upstream end, downstream end, upstream portion, middle portion and downstream portion;
  (f) a radially extending controller port; and
  (g) a radially extending flow limiter port in fluid communication with the axially extending passageway;
(2) a user-actuable valve member disposed in the downstream portion adjacent to the controller port and a controller disposed in the controller port and mechanically coupled to the user-actuable valve member;
(3) a one-way valve disposed in the axially extending passageway in the upstream portion, the one-way valve being configured for permitting fluid to flow into, but not out of, the upstream end of the axially extending passageway; and
(4) an adaptor member having an axially extending wall portion defining an interior passageway configured for receiving the one-way valve, and an exterior surface sized and configured for being received in the upstream portion of the axially extending passageway.

19. The valve of claim 18 further comprising a flow limiter valve disposed in the flow limiter port, the flow limiter valve extending into the middle portion of the axially extending passageway to cause fluid flowing through the axially extending passageway to flow through the flow limiter valve.

20. A valve for use in a water recirculation system comprising
(1) a unitary body member including
  (a) an upstream end and an upstream portion disposed adjacent to the upstream end;
  (b) a downstream end and a downstream portion disposed adjacent to the downstream end;
  (c) a middle portion disposed between the upstream portion and the downstream portion;
  (d) a radially outwardly facing outer wall including a threaded portion adjacent to the upstream end;
  (e) a radially inwardly facing inner wall defining an axially extending passageway extending between the upstream end and the downstream end, and through the upstream portion, middle portion and downstream portion of the body member, the axially extending passageway including a corresponding upstream end, downstream end, upstream portion, middle portion and downstream portion;
  (f) a radially extending controller port; and
  (g) a radially extending flow limiter port in fluid communication with the axially extending passageway:
(2) a user-actuable valve member disposed in the downstream portion adjacent to the controller port and a controller disposed in the controller port and mechanically coupled to the user-actuable valve member;
(3) a flow limiter valve disposed in the flow limiter port, the flow limiter valve extending into the middle portion of the axially extending passageway to cause fluid flowing through the axially extending passageway to flow through the flow limiter valve;
(4) a one-way valve disposed in the axially extending passageway in the upstream portion, the one-way valve being configured for permitting fluid to flow into, but not out of, the upstream end of the axially extending passageway;
(5) a tail piece configured for being coupled to another connector, the tail piece including a radially outwardly extending flange portion; and
(6) a nut member having a threaded radially inwardly facing surface for threadedly engaging the threaded portion of the body member, and a radially inwardly extending lip portion for engaging the radially outwardly extending flange of the tail piece.

21. A valve for use in a water recirculation system comprising
a unitary body member including
  (a) an upstream end and an upstream portion disposed adjacent to the upstream end;
  (b) a downstream end and a downstream portion disposed adjacent to the downstream end;
  (c) a middle portion disposed between the upstream portion and the downstream portion;
  (d) a radially outwardly facing outer wall;
  (e) a radially inwardly facing inner wall defining an axially extending passageway extending between the upstream end and the downstream end, and through the upstream portion, middle portion and downstream portion of the body member, the axially extending passageway including a corresponding upstream end, downstream end, upstream portion, middle portion and downstream portion;

(f) a radially extending controller port; and (g) a radially extending flow limiter port in fluid communication with the axially extending passageway;

a flow limiter valve disposed in the flow limiter port, the flow limiter valve extending into the middle portion of the axially extending passageway to cause fluid flowing through the axially extending passageway to flow through the flow limiter valve, the flow limiter valve including a housing defining an exterior and an interior, the housing including at least one aperture to permit fluid to flow from the axially extending passageway into the interior of the passageway;

an outflow aperture to permit fluid in the interior to flow back into the axially extending passageway, a closure member movable in relation to the outflow aperture, and a spring coupled to the closure member for biasing the closure member away from the outflow aperture, wherein fluid pressure passing through the housing aperture exerts force on the closure member to move the closure member toward the outflow aperture to reduce the effective area of the outflow aperture to thereby control the amount of fluid that can flow back into the axially extending passageway.

* * * * *